Jan. 16, 1934.   J. R. HEIDLOFF   1,943,959
HYDRAULIC BRAKE
Filed Jan. 20, 1930

Inventor:
Joseph R. Heidloff
By Williams, Bradbury, McCaleb & Hinkle
Attys.

Patented Jan. 16, 1934

1,943,959

UNITED STATES PATENT OFFICE 1,943,959

HYDRAULIC BRAKE

Joseph R. Heidloff, Detroit, Mich., assignor to Hydraulic Brake Company, Los Angeles, Calif., a corporation of California Application January 20, 1930. Serial No. 422,002

5 Claims. (Cl. 188—106)

My invention relates to brakes and more particularly to the type of brakes ordinarily employed on motor vehicles.

It has been determined from experiment that automobile drivers, considered as a class, are able to expend greater energy in the application of the brakes actuated by a pedal than by a hand lever. It has also been determined that in the ordinary type of brake either operated by hydraulic pressure or by direct mechanical action in which equal force is applied to the forward and to the reverse brake shoe by a single force applying mechanism, or to both ends of a single shoe fixed at some intermediate point, the forward shoe or end produces about 80% of the braking torque while the reverse shoe or end produces only 20% of the braking torque. It is apparent, therefore, that 50% of the energy exerted by the driver is expended in producing 20% of the braking torque.

It is the object of my invention to provide a combined mechanically and hydraulically operable braking mechanism in which advantage is taken of the experimentally determined facts above stated.

Another object of my invention is the provision of such a combined braking mechanism in which force from the mechanically operable mechanism is transmitted directly through the hydraulically operable mechanism.

Another object is the provision of such a combination in which the mechanical force applying mechanism is adapted to exert substantially twice as much force on the forward brake shoe as on the reverse brake shoe, since as above pointed out the forward brake shoe is substantially four times as efficient as the reverse brake shoe and the total braking torque to be secured from a given amount of energy is increased as the proportion of the given energy applied to the forward brake shoe is increased.

Figure 1:
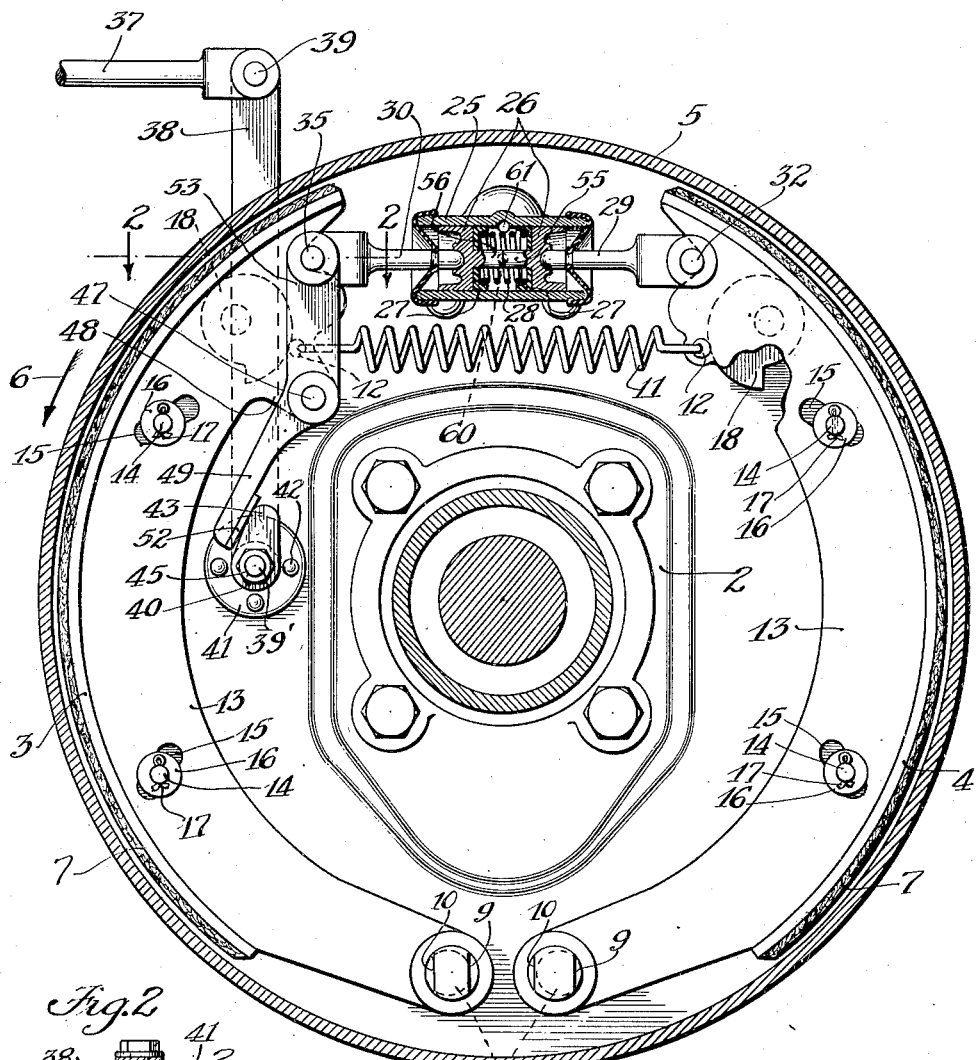
Figure 2:
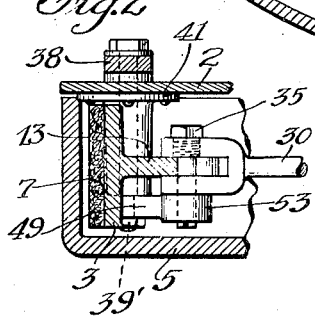

In the accompanying drawing illustrating one specific embodiment of my invention, Figure 1 is a vertical section taken through the drum and at one side of the shoes looking toward the supporting pan, also showing the hydraulic cylinder in longitudinal section;

Figure 2 is a detailed cross section taken substantially on the line 2—2 of Figure 1;

In the drawing illustrating my invention I have shown the pan 2 of any conventional form on which the brake shoes are mounted. I have illustrated a forward brake shoe 3 and a reverse brake shoe 4 which may be of any suitable design, except as modified for the application of my invention.

The drum 5 of usual form rotates in the direction of the arrow 6 when the vehicle to which the brake is applied is moving in a forward direction. The brake shoes 3 and 4 may have fixed to their braking surface suitable brake lining 7. The brake shoes 3 and 4 are pivoted to the pan 2 by means of eccentric bolts 8 having flattened portions 9 and 10 to facilitate the application of a wrench for rotating the same whereby adjustment of the pivotal position of the brake shoes is afforded. For the purpose of retracting the brake shoes from the drums after the application of force has been discontinued, I provide a coil spring 11 the ends of which pass through openings 12 in the inwardly extending flanges 13 of the brake shoes. For the purpose of guiding the brake shoes throughout their range of movement I provide pins 14 fixed to the pan 2 and extending through slots 15 in the flanges 13. A washer 16 fitting on the end of the pin 14 is provided and is held in place by suitable locking means such as cotter keys 17 extending through the ends of the pins 14.

In order to limit the retractile movement of the brake shoes and to eliminate excessive lost movement of the brake shoes upon reapplication of the brakes, I provide an adjustable cam 18 engaging the inner surface of the braking flange so that when the shoes are retracted by means of the spring 11 they engage the surface of the cams 18 which may be rotated to compensate for the wear on the brake lining in a well-known manner. For the purpose of forcing the brake shoes into engagement with the drum, I provide a combined mechanism consisting of hydraulically operable means, and mechanically operable means which is adapted to transmit its force through the medium of the hydraulically operable means, thereby eliminating numerous and complicated elements and at the same time providing a mechanism by which forces of equal magnitude are transmitted to both of the brake shoes by means of hydraulic pressure, and means whereby a greater force is applied to the forward brake shoe than to the reverse brake shoe by direct mechanical action.

The cylinder 25 is adapted to receive fluid under pressure for actuating the pistons 26 fitted in its ends and movable therein. Suitable cups 27, preferably of rubber or similar material, are seated on the inner faces of the pistons and against the inner surface of the cylinder for preventing leakage of fluid by the pistons. The coil spring 28 urges outwardly on the cups 27, holding them firmly against the pistons and holding the pistons against the inward ends of piston rods 29 and 30, which inner ends are partially spherical to permit slight lateral movement of the outer ends of the piston rods during operation. The outer end of piston rod 29 is provided with a pin 32 which engages the upper end of the flange 13 on the reverse shoe 4. The piston rod 30 is provided with a similar pin 35 which in like manner engages the flange 13 adjacent the upper end of the forward shoe 3.

For mechanically actuating the brake shoes I provide a pull rod 37 pivoted to an oscillatory arm 38 at 39. The lower end of arm 38 is provided with a pin 39' which passes through the pan 2 and is journalled in a bearing plate 40 having a flange 41 fixed to the pan 2 by means of suitable rivets 42. A cam 43 is suitably fixed to the pin 39 and is held on the pin by a nut 45. A bell crank lever pivoted on the pin 47 fixed to an inwardly extending flange 48 on the forward shoe has its lower end 49 extending downwardly to a position adjacent the cam 43 and is provided with a wear plate 52 adapted to be engaged by the cam 43 for causing the bell crank lever to oscillate on the pivot 47 and force the upper end 53 in a clockwise direction as shown in Figure 1. This clockwise movement of the bell crank lever moves the piston rods 29 and 30 to the right by virtue of the extensions 55 and 56 on the pistons, which are so positioned that they abut each other when the piston rod 30 is forced to the right, thereby causing the reverse shoe to be pressed into engagement with the drum 5. The pin 35 at the same time becomes disengaged from the forward shoe 3 and force for pressing the shoe 3 against the drum is transmitted through the pin 47 at the mid point of the bell crank lever. Since the lower end 49 of the bell crank lever is substantially the same length as the upper end 53, and since the cam 43 actuates the lower end, the force exerted against the forward brake shoe is twice as great as the force exerted against the rearward brake shoe. On the other hand, it will be noted that when hydraulic pressure is applied to the faces of the pistons 26, the pin 35 engages the flange 13 on the upper end of the forward brake shoe, thereby transmitting an equal force to both brake shoes.

This arrangement is particularly advantageous, since it is usual to operate the mechanically operable mechanism by a hand lever, whereas it is also usual to apply the fluid pressure for the cylinder 25 by means of a foot lever. It will be understood, however, that it is not essential that the mechanism be so operated, as either may be operated by a hand lever or by a foot lever without departing from the scope of this invention.

The cylinder 25 is provided with a fluid intake port 60 of any usual form and a bleed port 61 for the purpose of withdrawing the air from the cylinder, but as these details are not a part of my invention, further description of them is thought to be unnecessary.

It will be understood from the foregoing description that by means of this invention I have taken advantage of the fact that the forward brake shoe has a greater efficiency in that I have applied the mechanically operable mechanism in such a way as to exert a greater proportion of the energy on the forward brake shoe than on the reverse brake shoe, since it is usually used as an emergency brake and should be very positive in its action. Since it is usual to apply fluid to the cylinder 25 by means of a foot pedal, the force of application is normally greater than the force exerted by the pull rod 37 and normally sufficient force for application of the brakes will be exerted by making both pistons 26 of the same size and obtain practically the same total braking torque by means of the hydraulically operable mechanism as by the mechanically operable mechanism.

While I have described one specific embodiment of my invention, it will be apparent to those skilled in the art that other modifications may be devised without departing from the scope of my invention as set forth in the appended claims.

I claim as my invention:

1. In a brake mechanism, the combination of a drum with a forward brake shoe and a reverse brake shoe, mechanism operable for forcibly pressing said brake shoes against said drum, comprising a cylinder, a piston in each end of said cylinder adapted to be actuated by fluid pressure within said cylinder, piston rods operably connecting each of said pistons with one of said brake shoes for actuating the same, an arm pivotally mounted intermediate its ends on one of said brake shoes, and having one end operably connected to the other brake shoe through the medium of said piston rods and means for applying force to the other end of said arm.

2. In a brake mechanism, the combination of a drum with a forward brake shoe and a reverse brake shoe, mechanism operable for forcibly pressing said brake shoes against said drum, comprising a cylinder, a piston in each end of said cylinder adapted to be actuated by fluid pressure within said cylinder, piston rods operably connecting each of said pistons with one of said brake shoes for actuating the same, a bell crank lever pivoted intermediate its ends to the forward brake shoe, one end of said lever operably connected with the reverse brake shoe through the medium of said piston rods for actuating the same, and means for applying force to the other end of said lever for oscillating the same whereby a greater force is transmitted to the forward brake shoe than to the reverse brake shoe.

3. In a brake mechanism, the combination of a drum with brake shoe means, mechanism operable for forcibly pressing said brake shoe means against said drum, comprising a cylinder, a piston in each end of said cylinder adapted to be actuated by fluid pressure within the cylinder, piston rods operably connected with said brake shoe means for actuating the same, an arm pivotally mounted intermediate its ends on said brake shoe means, one end of said arm being operably connected to one of said piston rods through the medium of said pistons for actuating the same and means for applying force to the other end of said arm.

4. In a brake mechanism, the combination of a drum with a forward brake shoe and a reverse brake shoe, hydraulically operable mechanism for forcibly pressing said shoes against said drum, mechanically operable mechanism for forcibly pressing said shoes against said drum, comprising a member pivotally secured to one of said shoes and operably connected to the other shoe through the medium of said hydraulically operable mechanism, and means for actuating said member.

5. In a brake mechanism of the class described, the combination of a drum, a pair of brake shoes engageable with said drum, mechanism operable for forcibly pressing said brake shoes against said drum, said mechanism comprising a cylinder, spaced pistons in said cylinder adapted to be actuated by fluid pressure within said cylinder, each piston being operably connected with a brake shoe for actuating the same, spaced sealing means carried by said pistons, and abutting means associated with said pistons; a lever arm pivotally mounted on one of said brake shoes and having a part operably connected to the other brake shoe through the non-yielding transmission provided by said pistons and their associated abutting means, and means for applying force to said lever arm.

JOSEPH R. HEIDLOFF.